United States Patent
Chhabra et al.

(10) Patent No.: US 9,565,157 B2
(45) Date of Patent: Feb. 7, 2017

(54) METHOD FOR DNS RESOLUTION OF CONTENT REQUESTS IN A CDN SERVICE

(75) Inventors: Parminder Chhabra, Madrid (ES); Armando Antonio Garcia Mendoza, Madrid (ES); Carmelo Acosta Ojeda, Madrid (ES); Pablo Rodríguez Rodriguez, Madrid (ES); Alvaro Saurín Parra, Madrid (ES)

(73) Assignee: Telefonica, S.A., Madrid (ES)

( * ) Notice: Subject to any disclaimer, the term of this patent is extended or adjusted under 35 U.S.C. 154(b) by 648 days.

(21) Appl. No.: 14/117,191

(22) PCT Filed: May 7, 2012

(86) PCT No.: PCT/EP2012/058395
§ 371 (c)(1),
(2), (4) Date: Jun. 12, 2015

(87) PCT Pub. No.: WO2012/152765
PCT Pub. Date: Nov. 15, 2012

(65) Prior Publication Data
US 2015/0288647 A1    Oct. 8, 2015

(30) Foreign Application Priority Data

May 12, 2011  (ES) .................................. 201130754

(51) Int. Cl.
  *G06F 15/16*   (2006.01)
  *H04L 29/12*   (2006.01)
  *H04L 29/08*   (2006.01)
(52) U.S. Cl.
  CPC ....... *H04L 61/1511* (2013.01); *H04L 61/1552* (2013.01); *H04L 61/609* (2013.01);
  (Continued)

(58) Field of Classification Search
  CPC .......... H04L 29/08; H04L 29/12; H04L 67/02; H04L 61/609; H04L 61/1552; H04L 61/1511; H04L 67/28; H04L 67/2814; H04L 67/1023
  See application file for complete search history.

(56) References Cited

U.S. PATENT DOCUMENTS

2004/0221019 A1* 11/2004 Swildens ............... G06Q 40/00
                                                     709/217
2011/0078230 A1*  3/2011 Sepulveda ........... H04N 21/222
                                                     709/203

FOREIGN PATENT DOCUMENTS

DE    EP 3054654 A1 *  8/2016  .......... H04L 61/1511
WO    2010/099367 A2   9/2010
WO    2011/037910 A1   3/2011

OTHER PUBLICATIONS

Adolfo M. Rosas et al., "Evolutionary projects in Content Delivery," Future Internet Assembly, May 15, 2010, pp. 1-11.
(Continued)

*Primary Examiner* — Benjamin M Thieu
(74) *Attorney, Agent, or Firm* — Sughrue Mion, PLLC (57) ABSTRACT

Comprises identifying an end point or content server that can best serve an end user that sent a DNS request to an ISP DNS resolver, given a geographically distributed network of end points. In particular, the method further comprises using the end points themselves and a tracker to identify and notify to the end user the IP addresses of the least-loaded and closest end points that can best serve the content request.

21 Claims, 3 Drawing Sheets

(52) U.S. Cl.
CPC .......... *H04L 67/02* (2013.01); *H04L 67/1023* (2013.01); *H04L 67/2814* (2013.01); *H04L 67/28* (2013.01)

(56) References Cited

OTHER PUBLICATIONS

Simon G. M. Koo et al., "Using P2P to Distribute Large-volume Contents—Research Problems, Solutions and Future Directions," 9th World Multi-Conference on Systemics, Cybernetics and Informatics, Jul. 13, 2005, pp. 1-4.

David Karger et al., "Web caching with consistent hashing," Computer Networks, May 17, 1999, pp. 1203-1213, vol. 31, No. 11-16.

International Search Report of PCT/EP2012/058395 dated Sep. 10, 2012.

\* cited by examiner

METHOD FOR DNS RESOLUTION OF CONTENT REQUESTS IN A CDN SERVICE

CROSS REFERENCE TO RELATED APPLICATIONS

This is a National Stage of International Application No. PCT/EP2012/058395 filed May 7, 2012, claiming priority based on Spanish Patent Application No. P201130754 filed May 12, 2011, the contents of all of which are incorporated herein by reference in their entirety.

FIELD OF THE ART

The present invention generally relates to a method for DNS resolution of content requests in a CDN service, comprising identifying an end point or content server that can best serve an end user, and more particularly to a method where the end points themselves collaborate in said DNS resolution.

PRIOR STATE OF THE ART

Next, terminology and definitions that might be useful to understand the present invention is included.

PoP: A point-of-presence is an artificial demarcation or interface point between two communication entities. It is an access point to the Internet that houses servers, switches, routers and call aggregators. ISPs typically have multiple PoPs.

Autonomous System (AS): An autonomous system is a collection of IP routing prefixes that are under the control of one or more network operators and presents a common, clearly defined routing policy to the Internet.

OB (Operating Business): An OB is an arbitrary geographic area in which the service provider's CDN is installed. An OB may operate in more than one region. A region is an arbitrary geographic area and may represent a country, or part of a country or even a set of countries. An OB may consist of more than one region. An OB may be composed of one or more ISPs. An OB has exactly one instance of Topology Server.

PID (Partition ID): This is merely a mapping of IP prefixes at the AS level to integers. This is a one-to-one mapping. This is a very coarse partitioning of IP prefixes.

DNS (Domain Name Service): DNS is a service that translates domain names into IP addresses. DNS resolution is hierarchical. If one DNS server does not know how to translate a domain name, it asks other DNS servers starting with the root DNS server until it finds the DNS server that can resolve the domain name.

Content Delivery Network (CDN): This refers to a system of nodes (or computers) that contain copies of customer content that is stored and placed at various points in a network (or public Internet). When content is replicated at various points in the network, bandwidth is better utilized throughout the network and users have faster access times to content. This way, the origin server that holds the original copy of the content is not a bottleneck.

DNS Redirection: This is the practice of redirecting the resolution of Domain Name System names to other DNS servers. In a CDN, this practice is used to direct end user requests to end points that are in close proximity to the requesting end users.

ISP DNS Resolver: Residential users connect to an ISP. Any request to resolve an address is sent to a DNS resolver maintained by the ISP. The ISP DNS resolver will send the DNS request to one or more DNS servers within the ISP's administrative domain.

URL: Simply put, Uniform Resource Locator (URL) is the address of a web page on the world-wide web. No two URLs are unique. If they are identical, they point to the same resource.

URL (or HTTP) Redirection: URL redirection is also known as URL forwarding. A page may need redirection if its domain name changed, creating meaningful aliases for long or frequently changing URLs, spell errors from the user when typing a domain name, manipulating visitors, etc. For the purpose of the present invention, a typical redirection service is one that redirects users to the desired content. A redirection link can be used as a permanent address for content that frequently changes hosts (much like DNS).

Bucket: A bucket is a logical container for a customer that holds the CDN customer's content. A bucket either makes a link between origin server URL and CDN URL or it may contain the content itself (that is uploaded into the bucket at the entry point). An end point will replicate files from the origin server to files in the bucket. Each file in a bucket may be mapped to exactly one file in the origin server. A bucket has several attributes associated with it—time from and time until the content is valid, geo-blocking of content, etc. Mechanisms are also in place to ensure that new versions of the content at the origin server get pushed to the bucket at the end points and old versions are removed.

A service provider's CDN customer may create as many buckets as she wants. A bucket is really a directory that contains content files. A bucket may contain sub-directories and content files within each of the sub-directories.

Geo-location: It is the identification of real-world geographic location of an Internet connected device. The device may be a computer, mobile device or an appliance that allows for connection to the Internet for an end user. The IP-address geo-location data can include information such as country, region, city, zip code, latitude/longitude of a user.

Consistent Hashing: This method provides hash-table functionality in such a way that adding or removing a slot does not significantly alter the mapping of keys to slots. Consistent hashing is a way of distributing requests among a large and changing population of web servers. The addition or removal of a web server does not significantly alter the load on the other servers.

MD5: In cryptography, MD5 is a widely used cryptographic function with a 128-bit hash value. MD5 is widely used to test the integrity of the files. MD5 is typically expressed as a hexadecimal number.

DSLAM: A DSLAM is a network device that resides in a telephone exchange of a service provider. It connects multiple customer Digital Subscriber Lines (DSLs) to a high-speed Internet backbone using multiplexing. This allows the telephone lines to make a faster connection to the Internet. Typically, a DSLAM serves several hundred residents (no more than a few thousand residents at the most).

DNS is a hierarchical naming convention for computers, services or any resource connected to the Internet [1]. The Domain Name System distributes the responsibility of assigning domain names to groups of users and organizations independent of their physical location in a meaningful way. It does so by designating authoritative name servers for each domain (e.g., com, edu, net, etc.). These authoritative name servers can designate other authoritative servers for their sub-domains [1]. This makes DNS both distributed and fault-tolerant.

Another key functionality of DNS is that it translates human friendly computer hostnames to IP-addresses. Any CDN service uses DNS as a way of locating its content servers in response to end user requests. DNS has its limitations when designing a content distribution solution since, ideally, the CDN infrastructure has to identify the content server that is closest to the end user and is not heavily loaded.

Consistent hashing is commonly used as a way of distributing content among machines in a datacenter. Consistent hashing, like naïve hashing, spreads a distributed dictionary fairly evenly across a cluster. However, unlike naïve hashing, consistent hashing requires only a small amount of data to be moved in the event of adding/removing machines from a cluster [1][7][8].

Locating the nearest and least-loaded content server for a requesting end user to deliver content is a well-known problem. Typical solutions include using a hierarchy of DNS servers together with a geo-IP database to identify the content server closest (as in [1][2]) to a requesting end user and use that server to deliver the content.

For instance, a company xyz.com that is a customer to a CDN provider, Akamai may resolve to a123.g.akamai.net in the CDN provider's nameserver. So, a query for akamai.net by the ISP DNS resolver returns an IP address for the top-level domain (TLD) of akamai.net. Next, a query for g.akamai.net returns an IP for the nearest second level DNS server to the ISP DNS resolver of the end user. The ISP DNS resolver then queries for a123.g.akamai.net. This query returns the IP address of the content server that can serve the requested content to the end user. The DNS resolution consists of two steps. In the first step, the TLD DNS server identifies the region or country to which the ISP DNS resolver belongs. It returns the IP address of the nearest DNS server (second-level DNS). The second DNS request (to the second-level domain DNS server) identifies the end point (or content server) that can best serve the requested content. This CDN solution may be deployed deep within an ISP network. The CDN service provider may be limited by how deep into the network an ISP is willing to allow such a system to be deployed (and may be restricted to deployment at the peering points or within an AS or at one or two locations in a country). So, the content may have to pass through several hops within the country before reaching the requesting end user.

Other solutions like [1][3] rely on a small number of large datacenters or [1][6] a large number of small datacenters connected by a well-provisioned private network to first identify a datacenter that is closest to the requesting end user. Once the datacenter is identified, an end point in the datacenter is identified to deliver the content. Since these datacenters connect to the Internet at a small number of peering points, the content still has to pass through several hops before reaching a requesting end user. Further, [5] relies on extensive storage and caching infrastructure at the major peering points. Amazon[4] provides CDN service using Amazon Cloudfront together with its simple storage service allowing end users to get data from various edge locations of the Internet that Amazon peers with.

Among the above solutions, [2] and [3] rely strictly on a hierarchy of DNS servers to identify the end point that can serve content to a requesting end user. However, Limelight differs from Akamai in that it lets its customers directly use Limelight hostnames on their websites. For example in [1][9], Amazon directly embeds the Limelight sub-hostnames of the form amazon-xxx.vo.IInwd.net (xxx is an integer). The amazon-xxx bucket (that holds the Amazon content) may be replicated at different nodes within the same datacenter and at multiple datacenters in Limelight's network. The other solutions ([4]-[6] as discussed above) use a combination of DNS and redirection to identify the content server. The redirection may take the form of either DNS redirection or HTTP redirection. In the former case, it involves redirecting DNS request to other DNS servers. In the latter case, a new redirection address is sent as part of the HTTP response.

All the solutions discussed so far ([2] and [3]-[6]) in identifying the end point to serve content use hardware load balancers to balance DNS load at the second level DNS. Furthermore, in said solutions end points are not involved in the process of identifying the end point that is best placed to deliver content.

Thus, all of said solutions have the drawbacks or DNS limitations of nor allowing to quickly identify the end point (or content server) that can best serve an end user given a geographically distributed network of end points are overcome.

DESCRIPTION OF THE INVENTION

It is necessary to offer an alternative to the state of the art which covers the gaps found therein, particularly those related to the DNS limitations of quickly identifying the end point (or content server) that can best serve an end user given a geographically distributed network of end points are overcome.

To that end, the present invention concerns to a method for DNS resolution of content requests in a CDN service, comprising identifying an end point or content server that can best serve an end user which has sent a DNS request to an ISP DNS resolver, given a geographically distributed network of end points.

Differently from the conventional proposals, in the method of the invention the DNS resolution is carried out, in a characteristic manner, by performing:

I) a DNS resolution stage, comprising performing the next steps:
   a) said ISP DNS resolver sending the received DNS request to an authoritative DNS server of a sub-zone, either previously known or identified by sending a request to the root DNS server of the requested domain;
   b) said sub-zone authoritative DNS server once identified, forwarding said DNS request to the tracker operating in said sub-zone, and said tracker forwarding the DNS request to one of said end points participating in said DNS resolution stage; and II) an HTTP redirection, comprising performing the next steps:
   c) resolving, said end point participating in said DNS resolution stage, the location of the ISP DNS resolver via a partition ID database to identify:
   the datacenter that can best serve the content; or
   at least one end point in the same datacenter that may serve the content; and
   d) performing, said end point participating in said DNS resolution stage, a consistent hash on the requested URL associated to said DNS request, building an address using a substring of the MD5 hash of content request and the location of said datacenter that can best serve the content or the location of said at least one end point in the same datacenter that may serve the content, and sending said address to the end user, directly or through intermediate entities, using a redirect message.

For an embodiment, the method of the invention is applied to a DNS resolution across only one region of an Operating Business (OB), said subzone is said one region, said DNS resolution stage of I) is a first DNS resolution stage, said redirect message being a HTTP redirect message, and the method further comprising a second DNS resolution stage comprising performing the next steps:

e) making, the end user, an address resolution request, for said received address, to said IDP DNS resolver;

f) forwarding, the ISP DNS server, said address resolution request to said sub-zone authoritative DNS server;

g) identifying, the sub-zone authoritative DNS server, at least said datacenter that can best serve the content indicated in said address and a tracker that can resolve the received address, and sends the address resolution request to said tracker;

h) performing, said tracker, a consistent hash on said substring of the URL hash to obtain the end point or end points, inside said datacenter, that can best serve the request;

i) sending, the tracker, a response including the address of at least one of said obtained end points to the sub-zone authoritative DNS server;

j) sending, the sub-zone authoritative DNS server, said tracker response to the ISP DNS resolver; and k) sending, the ISP DNS resolver, said tracker response to the end user.

For an embodiment, said step h) further comprises identifying, the tracker, the least-loaded end point in said nearest datacenter, by using information about the current load at said obtained end points, as the end point that can best serve content, and including the address of only said least-loaded end point into said tracker response sent at step i).

By means of the method of the invention, the tracker acts as a load balancer when distributing load to end points, the latter being involved in the process of identifying the end point that is best placed to deliver content.

Once the end user has received the tracker response, the method comprises, after said step j), attempting, the end user, to directly connect to said least-loaded end point which address is included into the tracker response, by sending a connect request thereto, in the form of a URL address, including said built address and an identifier of the requested content.

For an embodiment of the method of the invention, said step b) comprises said tracker using at least a round-robin scheme or a best effort geo-location scheme to match the DNS request with the end point participating in said DNS resolution stage from said end points.

As for the above mentioned previously identification of the authoritative DNS server of said sub-zone is concerned, said identification is performed, for an embodiment, via a geo-IP lookup.

As per an embodiment, said geo-IP lookup is carried out at an authoritative DNS server for a second-level domain, such as by performing the next steps:

said ISP DNS resolver querying a top-level domain DNS server to resolve a second-level domain of the address of said DNS request;

the top-level domain DNS server resolving the ISP DNS query with the IP address of said authoritative DNS server for said second-level domain;

the ISP DNS resolver querying said authoritative DNS server for said second-level domain to resolve said DNS request; and the authoritative DNS server for said second-level domain resolving the sub-zone via said geo-IP lookup, and responding to the ISP DNS resolver with the address of said sub-zone.

For an embodiment, the tracker response contains a list of addresses of part or all of the end points included in said nearest datacenter.

Said step h) further comprises, for an embodiment, identifying, the tracker, backup end points, outside said nearest datacenter, which can serve the request if needed, said list of said tracker response containing also addresses of said backup end points.

Said nearest datacenter is a local datacenter, and said backup endpoints belong to national and/or global datacenters, according to an embodiment.

For said embodiments where the tracker response includes said list of end points, the method comprises, after step j), attempting, the end user, to directly connect to one of the end points of the nearest datacenter, and if cannot get the content there from, attempting to connect to one of the backup end points included in said list.

Other embodiments of the method of the invention are described with reference to appended claims 13 to 21, and in a subsequent section related to the detailed description of several embodiments, including embodiments regarding inter-region and intra-region redirections where the above mentioned second DNS resolution stage is carried out by means of steps different to the ones described above for the embodiment related to a DNS resolution across only one region of an OB.

BRIEF DESCRIPTION OF THE DRAWINGS

The previous and other advantages and features will be more fully understood from the following detailed description of embodiments, with reference to the attached drawings, that must be considered in an illustrative and non-limiting manner, in which.

DETAILED DESCRIPTION OF SEVERAL EMBODIMENTS

The working of the DNS of a CDN service provider will now be described in detail. Content servers are typically placed in datacenters that are arranged in a hierarchical fashion. At the lowest level, a CDN provider serves content via datacenters either at the city or region level (e.g., a datacenter in Madrid to serve all of Madrid, a datacenter in Barcelona to serve all of Catalonia), at the country level (e.g., a datacenter in Madrid that acts as a backup for all content in Spain) and finally at the global level (e.g., a datacenter in London that acts as a backup for all of the content for the CDN service provider). Alternately, another example of a hierarchy may be as follows: to be closer to the end users, a CDN provider may deploy end points at the same premises that host the DSLAMs at the local level, serve content from a datacenter at the country level (e.g., a datacenter in Madrid acting as a backup at the national level for content served from the DSLAMs in Spain) and finally a datacenter in London acting as a global datacenter.

If the CDN infrastructure is unable to serve content from its datacenter at the local level, it can fall back on the datacenter at the national level. If the datacenter at the national level is unable of serve the requested content, it can fall back on the global datacenter to serve the content. A downside of this approach is that the CDN operator will incur a transit cost to send data from a global datacenter.

Each component of the CDN service provider's subsystem is described next. The infrastructure consists of Origin Servers, Trackers, End Points, Topology Server, DNS server and Entry Point.

Publishing Point (Entry Point): Any CDN customer may interact with the CDN service provider's infrastructure solely via the publishing point (sometimes also referred to as the entry point for simplicity). The publishing point runs a web services interface with users of registered accounts to create/delete and update buckets.

A CDN customer has two options for uploading content. The customer can either upload files into the bucket or give URLs of the content files that reside at the CDN customer's website. Once content is downloaded by the CDN infrastructure, the files are moved to another directory for post-processing. The post-processing steps involve checking the files for consistency and any errors.

End Point: An end point is the entity that manages communication between end users and the CDN infrastructure. It is essentially a custom HTTP server.

In addition, the end points maintain a geo-IP database and table of a list of datacenters.

Tracker: The tracker is the key entity that enables intelligence and coordination of the CDN service provider's infrastructure. In order to do this, a tracker maintains (1) detailed information about content at each end point and (2) collects resource usage statistics periodically from each end point. It maintains information like number of outbound bytes, number of inbound bytes, number of active connections for each bucket, size of content being served etc.

When an end user makes a request for content, the tracker uses the statistical information at its disposal to determine if (1) the content can be served to the requesting end user and if so, (2) determines the closest end point and one with the least load to serve an end user. Thus, the tracker acts as a load-balancer for the CDN infrastructure.

Origin Server: This is the server(s) in CDN service provider's infrastructure that contains the master copy of the data. Any end point that does not have a copy of the data can request it from the origin server. The CDN customer does not have access to the origin server. CDN service provider's infrastructure moves data from the publishing point to the origin server after performing sanity-checks on the downloaded data.

Topology Server: The information about the network topology of an OB is maintained in its topology server. The network topology is really a cost matrix across network paths. The cost matrix is used by the CDN in choosing the path when delivering content to the end point.

DNS Server: The TLD DNS server is authoritative for the namespace of the service provider's CDN, t-cdn.net. In addition, each region in the service provider's CDN has a DNS server that is authoritative for its region.

Live Splitter: When the customer creates a bucket for a "live" channel (or event), it is passed to the live splitter. The live splitter serves as an origin server for a live stream. The live splitter is responsible for getting a live-stream, splitting the received live stream and using a segmenter to create a playlist. The playlist generated is sent to end points that can serve live content.

Figure 2:
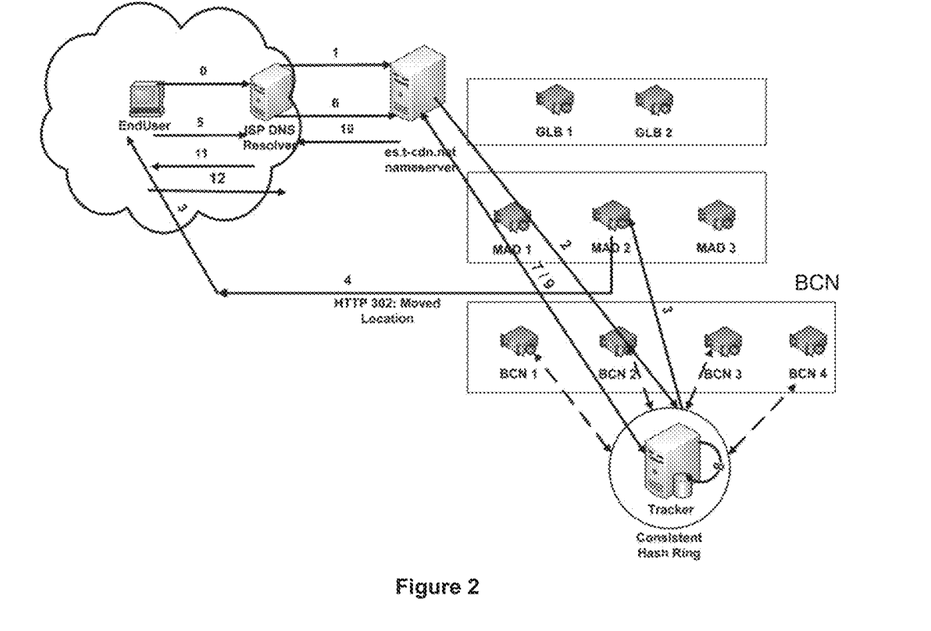
FIG. 2 shows another embodiment of the method of the invention, for an example scenario of DNS resolution that involves a three level hierarchy of datacenters.

With reference to FIG. 2, consistent hashing is disclosed, for an embodiment of the method of the invention, for identifying some machines, or end points.

Consistent Hashing: Given a key (here, MD5(URL) of the resource that an end user needs), it is needed to find the primary, secondary and tertiary servers for the requested content.

1. Resources (content servers) are mapped to points on the unit circle. If a server has twice the storage as the others, two resources are created out of this server and both mapped to the unit circle. The following procedure is used to map servers to a unit circle.

In the case of N machines $(1, \ldots, N)$, if the hash function used has a range $[0, R)$, the hash function result is rescaled via $r \rightarrow h(r)/R$ so that the hash function maps to the range $[0,1)$, i.e., onto a unit circle.

2. Just as in (1.), URLs of content are mapped to the same unit circle described above. It is used a hash function that maps hexadecimal numbers to Integers. Subsequently, the hash function result is rescaled as in (1.) to the same unit circle.

The CDN infrastructure hashes the URL of content. It takes the first few bytes of MD5 (URL) and maps it to the unit circle. The content is mapped to the server that is closest to it on the unit circle (the primary server). By mapping the content to more than one server, secondary and tertiary servers are created for the requested content.

3. The CDN infrastructure is arranged in a hierarchy of datacenters, at the city (or region), national and the global level. In doing the mapping using (2.), primary and secondary (and tertiary) servers that will store content at each of the hierarchies are identified.

4. At least two servers are associated in the primary datacenter that contain the mapping between customer content (URLs) and the content servers (or end points). Likewise, we associate the content with at least one server in each of the secondary and tertiary datacenters.

There are several ways of mapping URLs to machines: Start with a URL mapping on a unit circle and walk clockwise or anti-clockwise on the unit-circle. In either case, it stops once we have found machines in the local, national and the global datacenters that can serve the content. This ensures that machines in close proximity of the URLs will contain the content pointed to by the URLs. Other techniques include the use of a distance-based metric that maps only those machines to the URL that are in the immediate proximity of the URL mapping (or URLs that have been mapped to the unit circle).

Figure 3:
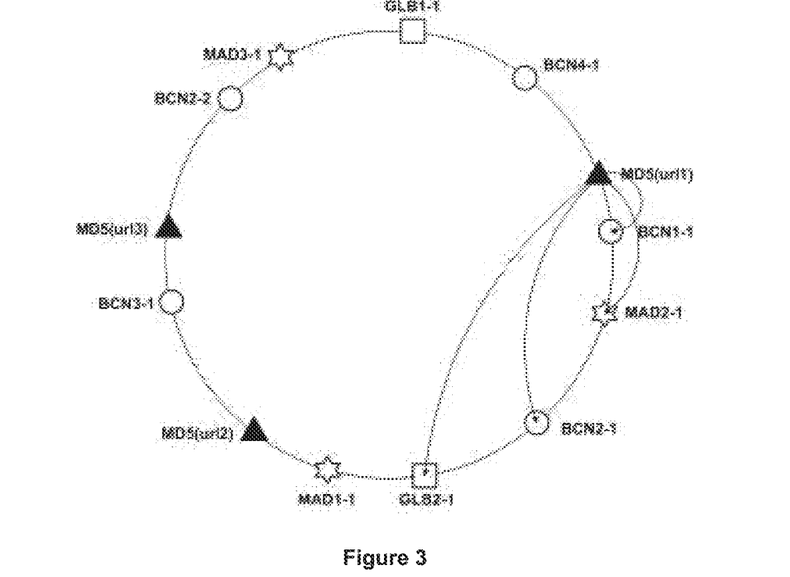
FIG. 3 shows a consistent hash ring that maps content (URLs) and resources (machines) to a unit circle. Content is then mapped to machines by executing a clockwise walk until primary, secondary and tertiary servers are identified.

As shown in FIG. 3, url1, url2 and url3 are three distinct URLs of video files. The first few bytes of the MD5 of the URLs are then mapped to the unit circle.

BCN1, BCN2, BCN2, BCN3 and BCN4 are four machines in the Barcelona datacenter. Here, the machine BCN2 has twice the memory of BCN1, BCN3 and BCN4. Hence, the machine BCN2 is hashed twice on this ring using IP_address-1 and IP_address-2 to give us BCN2-1 and BCN2-2. All the other machines have a suffix "-1" to their name (or IP-address).

MAD1, MAD2 and MAD3 are three machines in the Madrid datacenter. Similarly, GLB1 and GLB2 are two machines run by the CDN provider in a global datacenter. Machines in Madrid and global datacenter are also hashed to the consistent hash ring as seen in FIG. 3.

By associating machines in various datacenters with the urls of the content, the tracker knows the machines in the datacenter associated with the URL. In the above example, the MD5 of URL1 maps to a point on the unit circle. There are several ways by which one can map the URL to the machines in the datacenter that will host the content (shortest distance between the URL mapping and the machines(s), walking clockwise or anti-clockwise on the unit-circle). In either case, according to the method of the invention, it stops once machines have been found in the local, national and the global datacenters. In the above example, machines are picked by moving in a clockwise direction. By moving in a clockwise direction, the following hosts will be associated with content file of URL1; BCN1-1, MAD2-1, BCN2-1, and GLB2-1. By the same rationale, BCN3-1, BCN2-2, MAD3-1 and GLB1-1 are picked to host content for URL2.

When a bucket is added or removed, items are reassigned. Most of the URL to machine mappings are unaffected. If a machine is removed, the URL mappings from the machine removed are distributed to other machines in the neighbourhood of the URLs. The number of URLs that need to be moved is typically a small fraction of total number of URL mappings. Similarly, only a small fraction of URL mappings are affected when a machine is added.

The solutions cited in the Prior State of the Art section, use a 'bucket' as a unit representing all the content from a customer. Unfortunately, this implies that content distribution for a customer is coarse since all of a customer's content (a bucket) is stored in one or more content server. According to some embodiments of the present invention, the method comprises using the notion of a bucket as a starting point, where a bucket is merely a storage unit for one piece of content for a customer. This gives better granularity of storing and distributing content at end points.

Figure 1:
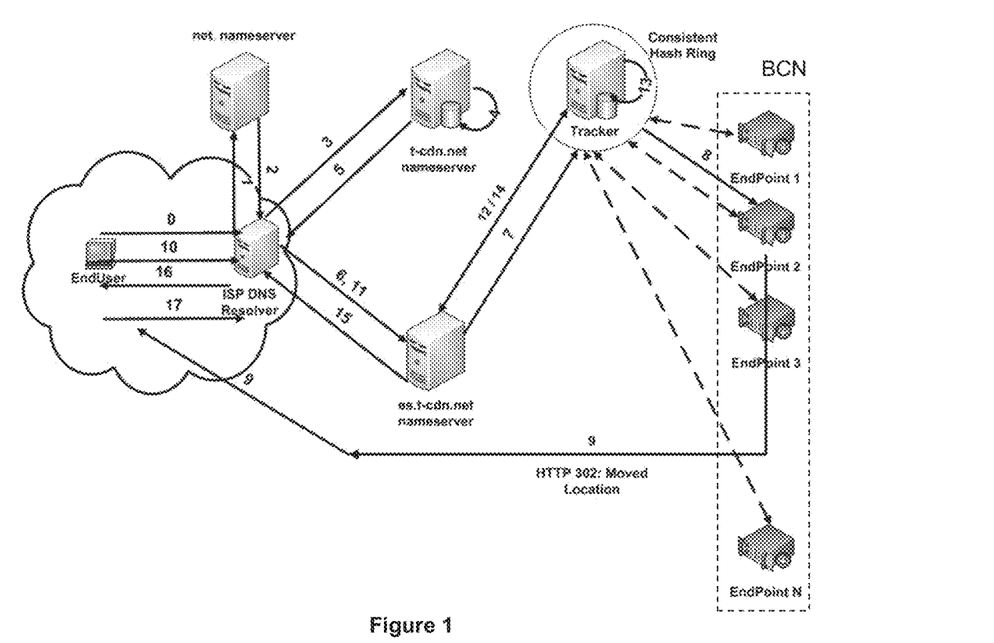
FIG. 1 shows the DNS resolution of the method of the invention, for an embodiment related to a DNS resolution across only one region of an OB. Once the DNS is resolved to the DNS server authoritative for the "es" sub-domain, the address resolution process entails two DNS lookups and a HTTP redirect.

Next, two alternative embodiments of the method of the invention are given, for different infrastructures, with reference to FIGS. 1 and 2, both of them having in common that they comprise the above described steps a) to k) of the method of the invention.

For both embodiments, any datacenter that hosts CDN content may store it in one or more machine. The goal is to come up with the machine that is most easily able to get data to the requesting end user.

Starting by the embodiment of FIG. 1, there the ISP DNS resolver is configured with known address of root servers. A query to one of the root servers will return the server authoritative for the top-level domain (TLD). In the method of the invention, the root DNS server will return the server authoritative for .net domain. As a next step, the TLD DNS server is queried for the server authoritative for the second-level domain (in the present example, this is the t-cdn.net domain). The query and responses are labelled. A detailed step-by-step description of DNS resolution is as follows:
A first DNS request, referred above as first DNS resolution stage:

(0) The user makes a request for a video bucket_id.t-cdn.net/bucket_id/video01.flv. For simplicity of explanation, let's set bucket_id=87. The request will now look like b87.t-cdn.net/87/video01.flv.

(1) The ISP DNS resolver queries the TLD DNS server for the .net domain to resolve t-cdn.net domain.

(2) The .net nameserver responds with the IP address of server authoritative for t-cdn.net domain. The t-cdn.net is the root DNS server of the service provider's CDN.

(3) The DNS server authoritative for second-level domain, t-cdn.net first infers b87.t-cdn.net to be an alias for b87.g.t-cdn.net. So, a query for the g.t-cdn.net domain will be performed.

(4) To resolve the sub-zone, it uses its geo-IP database. The geo-IP database maintains a mapping of IP prefixes to a sub-zone, represented by an integer or a string.

(5) The authoritative DNS server for the t-cdn.net domain resolves the sub-zone of ISP DNS resolver. In our example, the DNS server authoritative for the second-level domain responds with the sub-zone of the client as "es" (for Spain). Here, "es" stands for the integer 34. DNS server resolves the ISP IP address in the sub-zone to be es.t-cdn.net or 34.t-cdn.net.

(6) The DNS server 34.t-cdn.net is the authoritative DNS server for the "es" sub-zone. The ISP DNS resolver will then attempt to resolve b87.34.t-cdn.net by querying the authoritative DNS server in the sub-zone.

(7) The authoritative DNS server in the sub-zone has a list of all the end points. In addition, it has the address of the tracker that operates in the same region (or sub-zone) as the DNS server. So, a request of the form b87.34.t-cdn.net is forwarded to the tracker.

(8) The tracker forwards the request to any one of the end points using either a round-robin scheme or a best effort geo-location scheme that tries to match the request with the closest end point from {End Point 1, End Point 2, End Point 3, . . . , End Point N}. End point 2 receives the request. The end point performs a PID lookup on the ISP DNS resolver's IP address (say it is Barcelona) and identifies the BCN datacenter as one that can best serve the content.
An HTTP Redirection:

(9) End point 2 performs a consistent hash on the requested URL (here, "87/video01.flv"). Next, End point 2 returns HTTP 302, Moved Location b87-p9-habf8.34.t-cdn.net where abf8=sub-string(MD5(URL)) and is prefixed by h, the PID identified as 9 prefixed by p. The HTTP response is returned to the end user.
A second DNS request, referred above as second DNS resolution stage:

(10) The end user sends an address resolution request for b87-p9-habf8.34.t-cdn.net.

(11) The ISP DNS resolver forwards the address resolution request from the client to the DNS resolver in the "es" sub-zone (region 34).

(12) The datacenter/PoP is identified as 9 (datacenter in BCN). The address resolution request is now sent to the tracker.

(13) The tracker performs consistent hashing on abf8 to obtain {End Point 1, End Point 3, and End Point N} as end points that can best serve the request. The tracker takes into account current load at the end points and identifies end point 3 as being best suited to serve content.

(14) The response from the tracker identifying the list of end points in the order {End Point 3, End Point 1, and End Point N} is returned to the authoritative DNS resolver in the "es" sub-zone.

(15) The "es" sub-zone DNS resolver forwards the response to ISP DNS resolver.

(16) The ISP DNS resolver returns the response to the requesting End User.

(17) The End User will now directly connect to end point 3, the first end point in its returned list with a request of the form b87-p9-habf8.34.t-cdn.net/87/video01.flv. If the connection with end point 3 is unsuccessful, the end user will attempt to get the content from end point 1 and so on.

In summary, the content resolution entails two DNS requests and one HTTP redirection (HTTP moved location). The first DNS resolution identifies the datacenter geographically closest to the requesting client ISP DNS and results in a HTTP redirect after a consistent hash on the requested URL by an end point. The second DNS resolution results in the tracker identifying the machine (in the datacenter closest to the client ISP DNS) that can best serve the content after performing a consistent hash on the requested URL.

According to FIG. 2, another embodiment of the method of the invention is described, which is implemented in a scenario of DNS resolution that involves a three level hierarchy of datacenters, one at the region level, and another at the national level, and finally a global datacenter operated by the CDN operator that may or may not reside in the same country.

At the regional level, a CDN operator could have a datacenter in Barcelona that served entire Catalonia, for example. The national level datacenter could be at Madrid and the global datacenter may be in either in London or Madrid itself (not co-located with the national datacenter).

Along the same lines, another example could be considered: At the regional level, a CDN operator could have a datacenter in San Francisco that served all of California, a national datacenter in Portland, Oreg., that served as a backup for all the regional datacenters in the US and a global datacenter in Boise, Id.

Consider the following hierarchical datacenter layout: A Regional datacenter in Barcelona (BCN) that contains machines {BCN1, BCN2, BCN3 and BCN4}. The national datacenter in Madrid (MAD) contains machines {MAD1, MAD2 and MAD3}. The global datacenter, also in Madrid (but not co-located with the national datacenter) contains machines {GLB1 and GLB2}.

In this example of FIG. 2, the interaction between the ISP DNS resolver and the .net nameserver is not shown, on contrary to FIG. 1. Also, the interaction between the ISP DNS resolver and the t-cdn.net nameserver to resolve the region of the ISP DNS is not either shown. For simplicity, it is shown that the query is directly sent to the DNS server authoritative for the "es" sub-zone (region 34).

The steps of the method for this embodiment are the following:

A first DNS request, or first DNS resolution stage:

(0) Here, an End User in Gerona (a town in Catalonia) makes a request for a video b87.t-cdn.net/87/video01.flv.

(1) As per our simplifying assumption, the ISP DNS resolver directly sends the query to the DNS server authoritative for the "es" sub-zone (region 34). Therefore, the ISP DNS forwards a request of the form b87.34.t-cdn.net/87/video01.flv.

(2) The DNS server authoritative for region 34 forwards the received request to the tracker of region 34.

(3) The tracker in the "es" sub-zone uses the IP address set {BCN2, BCN3, BCN4, MAD2, MAD3, GLB2} and a round-robin scheme or a best effort geo-location scheme that tries to match the request with the closest end point to identify the next machine to whom it must send the resolution request. In the above set, we do not include machines that are under heavy utilization {BCN1, MAD1 and GLB1}. In this example, the request is forwarded to the end point MAD2. 4. The end user makes an address resolution request for abf8.bcn.es.t-cdn.net.

An HTTP redirection:

(4) The end point MAD2 performs a lookup on the PID of the IP of ISP DNS resolver. The MAD2 end point identifies the PID of the ISP DNS to be BCN (9, for Barcelona) and also performs an MD5 on the URL (here, "87/video01.flv"). Here, abf8=Sub-string(MD5(URL)). The MAD2 end point returns HTTP 302, Moved Location b87-p9-habf8.34.t-cdn.net. This response is returned to the end user.

(5) A second DNS request, or second DNS resolution stage:

(6) The end user makes an address resolution request for b87-p9-habf8.34.t-cdn.net/87/video01.flv.

(7) The ISP DNS resolver forwards the end user request to the authoritative DNS server in the "es" sub-zone.

(8) The DNS server authoritative in the "es" sub-zone receives the request from the ISP DNS server. The DNS server forwards the request to the tracker of the "es" sub-zone (region 34).

(9) On receiving the request from the region DNS server, the tracker identifies PID 9, BCN datacenter as one that is closest to the requesting end user. The tracker performs consistent hashing on abf8 to obtain the end points inside the BCN datacenter that can best serve the request. The tracker also identifies the backup nodes (outside the BCN datacenter) that can serve the request if needed. In this example, the tracker identifies {BCN4, BCN2, MAD2 and GLB2} as end points (in that order) that can best serve the request. So, we have two local end points, one at the national level and another one as a global fallback.

(10) The response, listing the IP addresses of the four machines is returned to the authoritative DNS server in the "es" sub-zone (region 34).

(11) The DNS server in the "es" sub-zone (region 34) forwards the response to the ISP DNS resolver.

(12) The ISP DNS resolver forwards the response containing the four IP addresses to the End User.

(13) The End User will now attempt to directly connect to the end point BCN4.

At step 10, the ISP DNS resolver has four IP addresses that correspond to the content video b87.34.t-cdn.net/87/video01.flv. This information remains in the cache until the TTL for the DNS cache expires. The DNS server can serve subsequent requests for the same content by other end users without having to go through the DNS resolution process again.

The process involves two DNS resolution queries and one redirection (HTTP Moved Location). The end point gets a list of IP addresses that can best serve the content. In the above example, if the end user cannot get the content from either BCN4 or BCN2, it will fall back on end point MAD2 at the datacenter at the national level and if unsuccessful again, will fall back on GLB2, at the global datacenter.

Explaining Redirections in Service Provider's CDN:

Next three embodiments of the method of the invention are described with reference to FIGS. 4, 5 and 6, that elucidate two different kinds of redirection that may occur in a service provider's CDN: (1) inter-region redirection, either within the same OB (FIG. 5) or between OBs (FIGS. 4) and (2) intra-region redirection that occurs between datacenters in the same region of an OB (FIG. 6).

Figure 4:
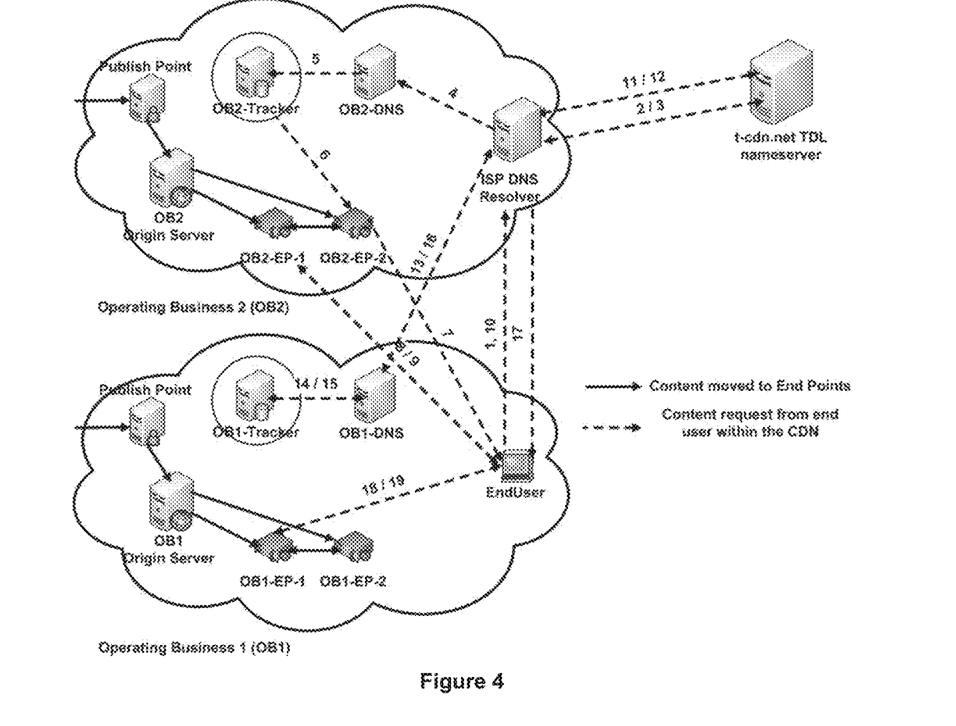
FIG. 4 shows the DNS resolution of the method of the invention for an embodiment regarding a DNS resolution with inter-region redirection between two operating businesses.
Figure 5:
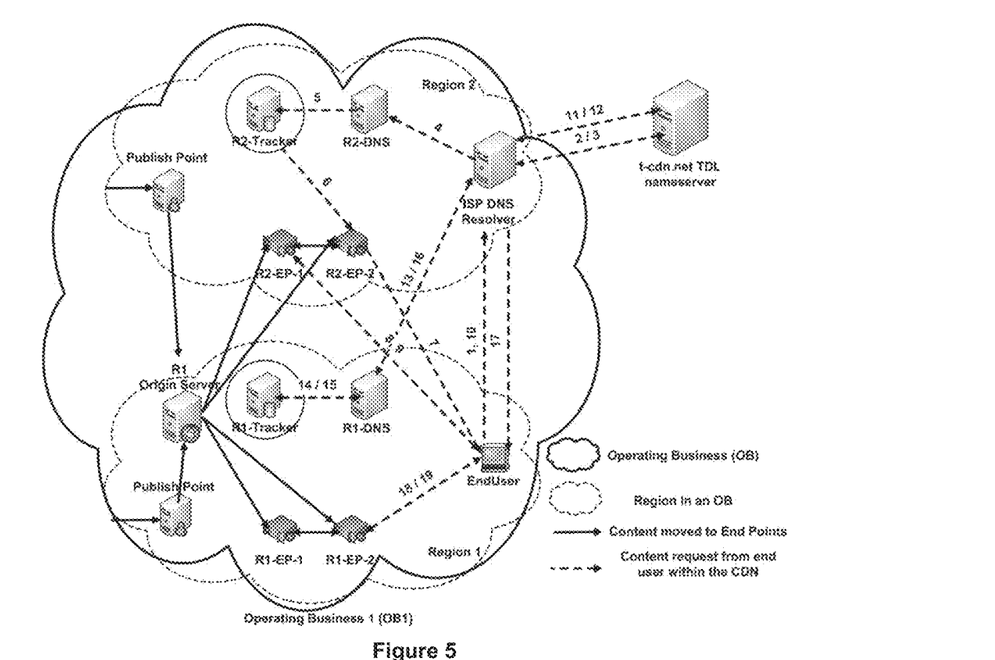
FIG. 5 shows another embodiment of the method of the invention, for an example scenario of DNS resolution with inter-region redirection between two regions of the same operating business.
Figure 6:
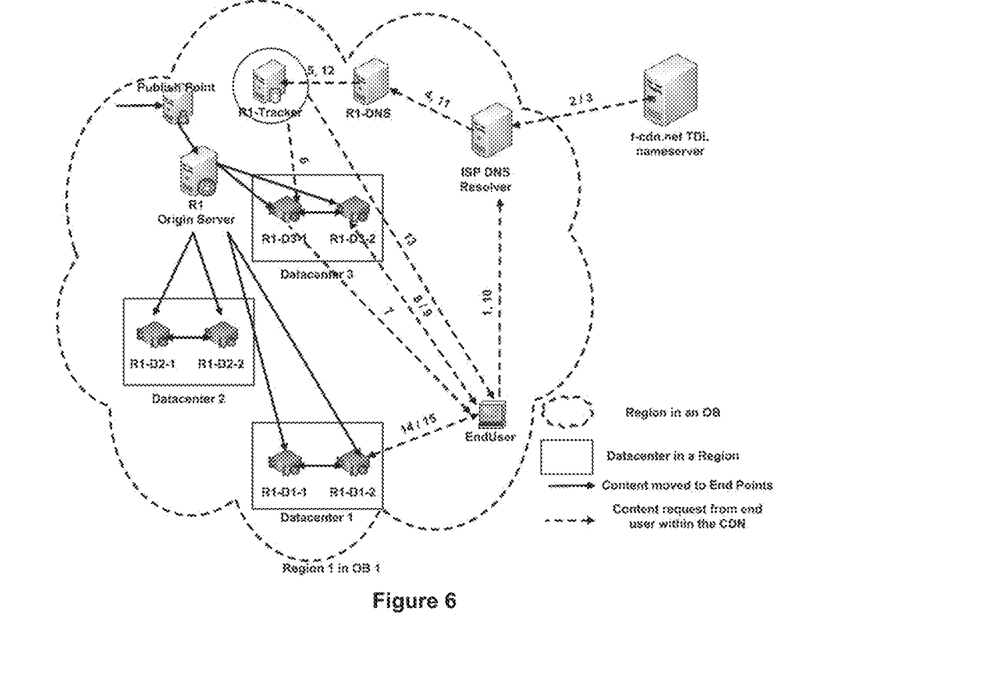
FIG. 6 shows the DNS resolution of the method of the invention for an embodiment regarding a DNS resolution with intra-region redirection between datacenters of the same OB.

Said FIGS. 4, 5 and 6 show two aspects of the CDN: (1) They show how content is moved in the CDN from the publishing point by a content owner (CDN customer) all the way to the end points that serve the content and (2) When an end user makes a content request, the CDN directs the content request to an end point that is both least loaded and geographically closest to the end user. This resolution of content request forms the core of this invention.

Inter-Region Redirection:

Two examples of inter-region redirection are considered. In the first case, an example of inter-region redirection between two operating businesses, OB1 and OB2 is shown. In the second example, inter-region redirection between two regions of the same operating business, OB1, is shown.

Inter-Region Redirection Between OBs:

In this example, two OBs, OB1 and OB2 are considered. Each of the two OBs has exactly one region. The OBs also connect to a global t-cdn.net nameserver. Using the setup in FIG. 4 as an example, it is described how inter-region redirection of a content request works when the ISP DNS resolver is not in the same OB (and hence, not in the same region) as a requesting end user.

The steps of the method for this embodiment are the following:

A first DNS request, or first DNS resolution stage:

(1) End user in OB1 makes a request for video01.flv. The request will now look like b87.t-cdn.net/87/video01.flv.

(2) The ISP DNS resolver queries the DNS server authoritative for the t-cdn.net domain to resolve the end user request.

(3) The t-cdn.net nameserver infers b87.t-cdn.net to be an alias for b87.g.t-cdn.net. So, a query for the g.t-cdn.net domain will be performed. The t-cdn.net nameserver looks up the region of the ISP DNS using its geo-IP database and responds with the IP address of the DNS server authoritative for the region of the ISP DNS, b87.44.t-cdn.net.

(4) The ISP DNS resolver will then attempt to resolve b87.44.t-cdn.net by querying the authoritative DNS server in the sub-zone, which is region 44 in OB2.

(5) The authoritative DNS server OB2-DNS forwards the request to the tracker in the same region (OB2-Tracker).

(6) The tracker in region 44, OB2-Tracker has a list of all the end points. It forwards the request to any one of the end points using either a round-robin scheme or a best effort geo-location scheme that tries to match the request with the closest end point from {End Point 1, End Point 2}.

An HTTP redirection:

(7) End point OB2-EP-2 receives the request. The end point performs a PID lookup on the ISP DNS resolver's IP address and identifies OB2-EP-1 as the end point that may serve the requested content. The end point OB2-EP-2 also performs an MD5 on the URL, "87/video01.flv." We take a sub-string of the URL (here, "87/video01.flv"). Here, abf8=Sub-string(MD5(URL)). To resolve the PID of the IP address, it looks up the PID database to build the URL b87-p1-habf8.44.t-cdn.net/87/video01.flv. The URL b87-p1-habf8.44.t-cdn.net/87/video01.fly together with the IP addresses of the end points {OB2-EP-1, OB2-EP-2} that are best suited to serve content in that order are returned to the end user.

In reality, the end point OB2-EP-2 returns the end points without an ordering to the tracker. Since the tracker maintains statistical information about load at each end point, the tracker does the ordering and returns the result to the DNS server authoritative for the subzone. The result is returned to the ISP DNS resolver and then to the end user. For clarity, the latest steps are not shown in FIG. 4.

(8) The end user will directly connect to OB2-EP-1 with the URL b87-p1-habf8.44.t-cdn.net/87/video01.flv.

(9) The end point OB2-EP-1 receives the request and verifies the region information based on the IP address of the end user. The end point identifies the region to be that of region 34 OB1 and the partition to be 1. So, the end point OB2-EP-1 returns a HTTP 302 redirect message with the URL b87-p1-habf8.34.t-cdn.net/-87/video01.flv.

A second DNS request:

(10) Next, the end user sends a request b87-p1-habf8.34.t-cdn.net/+87/video01.flv to the ISP DNS resolver.

(11) The ISP DNS resolver queries the DNS server authoritative of the t-cdn.net domain to resolve 34.t-cdn.net.

(12) The t-cdn.net nameserver looks up the region of the 34.t-cdn.net domain using its geo-IP database and responds with the IP address of the DNS server authoritative for the region 34.t-cdn.net.

(13) The ISP DNS resolver now queries the server authoritative for the subzone (region 34) to resolve b87-p1-habf8.34.t-cdn.net/+87/video01.flv. Server OB1-DNS receives the request.

(14) The authoritative DNS server in region 34 in OB1 has a list of all the end points (OB1-EP-1, OB1-EP-2) and the tracker in the region. The OB1-DNS server receives the request and forwards it to the tracker of the region 34, OB1-Tracker.

(15) The tracker in the sub-zone OB1-Tracker has a list of all the end points. The tracker recognizes that the request is a redirect request. The tracker identifies abf8 to be the MD5 of the substring of the URL "87/video01.flv." It also recognizes the PID of the request to be 1. It uses this information to identify the end points that are closest to the requesting end user from the list {OB1-EP-1, OB1-EP-2}. The tracker, OB1-Tracker returns the end points {OB1-EP-1, OB1-EP-2} in that order to the region DNS server, OB1-DNS.

(16) The set of end points returned from OB1-DNS to the ISP DNS resolver.

(17) The set of end points are returned from the ISP DNS resolver to the end user.

(18) The end user sends the content request to the end point OB1-EP-1 via the URL b87-p1-habf8.34.t-cdn.net/+87/video01.flv.

(19) The end point OB1-EP-1 serves the requested file video01.flv. The end point gets the content file from the OB1 origin server if needed.

End point OB-EP-1 receives the request. The end point performs a PID lookup on the end user's IP address (say it is Barcelona) and identifies itself to be in the same PID (BCN datacenter) that can best serve the content. The end point then serves the content to the end user if it already has video01.flv. If not, it gets the content from another end point in the same datacenter or reverts to the OB1 origin server before serving the end user.

Inter-Region Redirection Between Regions of the Same OB:

In this example, an OB with two distinct regions is considered. Each region has its own publishing point, DNS server authoritative for that region and a tracker.

FIG. 5 shows the redirection scenario that consists of one operating business, OB1. The figure also shows two regions, region 1 and region 2. Each region has a DNS server that is authoritative in its region and a tracker. Since both regions belong to the same OB, there is only one origin server.

The steps of the method for this embodiment are the following:

A first DNS request, or first DNS resolution stage:

(1) End user in OB1 makes a request for video01.flv. The request will now look like b87.t-cdn.net/87/video01.flv.

(2) The ISP DNS resolver queries the DNS server authoritative for the t-cdn.net domain to resolve the end user request.

(3) The t-cdn.net nameserver infers b87.t-cdn.net to be an alias for b87.g.t-cdn.net. So, a query for the g.t-cdn.net domain will be performed. The t-cdn.net nameserver looks up the region of the ISP DNS using its geo-IP database and responds with the IP address of the DNS server authoritative for the region of the ISP DNS, b87.2.t-cdn.net.

(4) The ISP DNS resolver will then attempt to resolve b87.2.t-cdn.net by querying the authoritative DNS server in the sub-zone, which is region 2 in OB1.

(5) The tracker in region 2 has a list of all the end points. It forwards the request to any one of the end points using either a round-robin scheme or a best effort geo-location scheme that tries to match the request with the closest end point from {End Point 1, End Point 2}.

An HTTP redirection:

(6) End point R2-EP-2 receives the request. The end point performs a PID lookup on the ISP DNS resolver's IP address and identifies R2-EP-1 as the end point that may serve the requested content. The end point R2-EP-2 also performs an MD5 on the URL, "87/video01.flv." We take a sub-string of the URL (here, "87/video01.fly"). Here, abf8=Sub-string (MD5(URL)). To resolve the PID of the IP address, it looks up the PID database to build the URL b87-p1-habf8.2.t-cdn.net/87/video01.flv.

(7) The URL b87-p1-habf8.2.t-cdn.net/87/video01.flv together with the IP addresses of the end points {R2-EP-1, R2-EP-2} that are best suited to serve content in that order are returned to the end user.

In reality, the end point R2-EP-2 returns the end points without an ordering to the tracker of region 2. Since the tracker maintains statistical information about load at each end point, the tracker does the ordering and returns the result to the DNS server authoritative for the subzone. The result is returned to the ISP DNS resolver and then to the end user. For clarity of the figure, the latest steps are skipped in FIG. 5.

(8) The end user will directly connect to R2-EP-1 with the URL b87-p1-habf8.2.t-cdn.net/87/video01.flv.

(9) The end point R2-EP-1 receives the request and verifies the region information based on the IP address of the end user. The end point identifies the region to be that of region 1 in OB1. So, the end point R2-EP-1 returns a HTTP 302 redirect message with the URL b87-p1-habf8.1.t-cdn-.net/-87/video01.flv.

A second DNS request, or second resolution request:

(10) The end user receives the response. Next, the end user sends a request b87-p1-habf8.1.t-cdn.net/+87/video01.flv to the ISP DNS resolver.

(11) The ISP DNS resolver queries the DNS server authoritative of the t-cdn.net domain to resolve 1.t-cdn.net.

(12) The t-cdn.net nameserver looks up the region of the ISP DNS using its geo-IP database and responds with the IP address of the DNS server authoritative for the region 1.t-cdn.net.

(13) The ISP DNS server now queries the server authoritative in region 1 to resolve b87-p1-habf8.1.t-cdn.net/+87/video01.flv. The DNS server R1-DNS receives the request.

(14) The authoritative DNS server in region 1 in OB1 has a list of all the end points (R1-EP-2, R1-EP-1) and the tracker in the region. The R1-DNS server receives the request and forwards it to the tracker of region 1, R1-Tracker.

(15) The tracker in the region 1, R1-Tracker has a list of all the end points. The tracker recognizes that the request is a redirect request. The tracker identifies abf8 to be the MD5 of the substring of the URL "87/video01.flv." It also recognizes the PID of the request to be 1. It uses this information to identify the end points that are closest to the requesting end user from the list {R1-EP-2, R1-EP-1}. The tracker, R1-Tracker returns the end points {R1-EP-2, R1-EP-1} in that order to the region DNS server, R1-DNS.

(16) The set of end points returned from R1-DNS to the ISP DNS resolver.

(17) The set of end points are returned from the ISP DNS resolver to the end user.

(18) The end user sends the content request to the end point R1-EP-2 via the URL b87-p1-habf8.1.t-cdn.net/+87/video01.flv.

(19) The end point R1-EP-2 serves the requested file video01.flv. The end point gets the content file from the OB1 origin server if needed.

End point R1-EP-2 receives the request. The end point performs a PID lookup on the end user's IP address and identifies itself to be in the same PID. The end point R1-EP-2 then serves the content to the end user if it already has video01.flv. If not, it gets the content from another end point in the same datacenter (same PID) or reverts to the OB1 origin server before serving the end user.

Both the above examples show that there is little difference in the redirection mechanism at the inter-region level whether the redirection occurs between two distinct OBs or within two regions of the same OB.

In the above examples, we do not show the interaction between the ISP DNS resolver and the .net nameserver as in FIG. 1 for simplicity. We assume that the ISP DNS resolver knows the address of the t-cdn.net nameserver to resolve the region of the ISP DNS.

Intra-Region Redirection

In this section is explained, with an example, how an intra-region redirection works in a service provider's CDN. FIG. 6 shows some of the components of an OB. Here, and operating business OB1 shown in the figure consists of:

one region, Region 1 three datacenters in Region 1 each of the datacenters has several end points that serve content to requesting end users The figure shows the how content is moved within the CDN from the publishing point to the origin server and then to the end points. End points in the same datacenter may exchange content with one another in a P2P fashion. FIG. 6 that shows only three datacenters may be generalized to have several datacenters and should not be seen as limiting the scope of the invention.

The steps of the method for this embodiment are the following:

A first DNS request, or first DNS resolution stage:

(1) End user in OB1 makes a request for video01.flv. The request will now look like b87.t-cdn.net/87/video01.flv.

(2) The ISP DNS resolver queries the DNS server authoritative for the t-cdn.net domain to resolve the end user request.

(3) The t-cdn.net nameserver infers b87.t-cdn.net to be an alias for b87.g.t-cdn.net. So, a query for the g.t-cdn.net domain will be performed. The t-cdn.net nameserver looks up the region of the ISP DNS using its geo-IP database and responds with the IP address of the DNS server authoritative for the region of the ISP DNS, b87.1.t-cdn.net.

(4) The ISP DNS resolver will then attempt to resolve b87.1.t-cdn.net by querying the authoritative DNS server in the sub-zone, which is region 1 in OB1.

(5) The tracker in region 1 has a list of all the end points. It forwards the request to any one of the end points using either a round-robin scheme or a best effort geo-location scheme that tries to match the request with the closest end point from {R1-D1-1, R1-D1-2, R1-D2-1, R1-D2-2, R1-D3-1, R1-D3-2}.

An HTTP redirection:

(6) End point R1-D3-1 receives the request. The end point performs a PID lookup on the ISP DNS resolver's IP address and identifies R1-D3-2 as the end point that may serve the requested content. The end point R1-D3-1 also performs an MD5 on the URL, "87/video01.flv." We take a sub-string of the URL (here, "87/video01.fly"). Here, abf8=Sub-string (MD5(URL)). To resolve the PID of the IP address, it looks up the PID database to build the URL b87-p2-habf8.1.t-cdn.net/87/video01.flv. Here, PID 1 identifies the datacenter 2 as best suited to serve content.

(7) The URL b87-p2-habf8.2.t-cdn.net/87/video01.fly together with the IP addresses of the end points {R1-D3-2, R1-D3-1} that are best suited to serve content in that order are returned to the end user.

As discussed in the previous cases, the end point R1-D3-1 returns the end points without an ordering to the tracker of region 1. Since the tracker maintains statistical information about load at each end point, the tracker does the ordering and returns the result to the DNS server authoritative for the subzone. The result is returned to the ISP DNS resolver and then to the end user. For clarity and ease of explanation, the latest steps are not detailed in FIG. 6.

(8) The end user will directly connect to R1-D3-2 with the URL b87-p2-habf8.2.t-cdn.net/87/video01.flv.

(9) The end point R1-D3-2 receives the request and verifies the region information based on the IP address of the end user. The end point identifies the PID 1 as better able to serve the end user. So, the end point R1-D3-2 returns a HTTP 302 redirect message with the URL b87-p1-habf8.1.t-cdn.net/_87/video01.fly (the underscore symbol signifying intra-region redirection).

A second DNS request, or second DNS resolution stage:

(10) The end user receives the response. Next, the end user sends a request b87-p1-habf8.1.t-cdn.net/_87/video01.flv to the ISP DNS resolver.

(11) The ISP DNS resolver identifies the request as being for region 1 and queries the authoritative DNS server in region 1. The query is forwarded to the DNS server R1-DNS (region 1 of OB1).

(12) The R1-DNS forwards the query to the tracker of region 1, R1-Tracker.

(13) The tracker identifies the query as being an intra-region redirection. The tracker identifies the PID and determines the end points in datacenter 1 that are best positioned to serve the content. The tracker then returns an ordered list of end points to the end user {R1-D1-2, R1-D1-1}.

(14) The end user connects directly to the end point R1-D1-2 with the URL b87-p1-habf8.1.t-cdn.net/_87/video01.flv.

(15) The end point R1-D1-2 will now serve the content to the requesting end user.

This invention presents the next advantages, depending on the embodiment:

By executing consistent hashing on the URL, it is possible to do load balancing at the file level.

In a CDN service, given that content may reside on a few of the hundreds (or thousands of servers), the invention overcomes DNS's limitation of being able to quickly identify the content server that can serve the requesting end user.

By invoking end points in content resolution, it is ensured that end point best suited to deliver content to a requesting end user is arrived at quickly.

The technique presented here ensures that data is preferentially served by end points closest to the requesting end user. If the closest end points are unable to serve the content (because they are overloaded), the responsibility of serving content falls back on end points that reside in the national datacenter. If the national datacenter is also unable to deliver the requested content, only then does the responsibility of serving content fall on end points in the global datacenter. This ensures speedy delivery of content to requesting end users whenever possible.

The CDN designed for an ISP, may be deployed as deep as needed within an ISP network.

Since the ISP DNS resolver saves (for the embodiment of FIG. 2) the IP address of the end point that will serve the requested content until its TTL expires in the DNS cache, new end users requesting the same content may get the location of the end point that can serve the content from the ISP DNS's cache (and thus, no have to do DNS resolution for every request).

The solution proposed obviates the need for hardware load balancers to answer queries at the second-level DNS since our tracker acts as a load-balancer for queries to the end points.

A person skilled in the art could introduce changes and modifications in the embodiments described without departing from the scope of the invention as it is defined in the attached claims.

Acronyms and Abbreviations

ADSL ASYMMETRIC DIGITAL SUBSCRIBER LINE
AS AUTONOMOUS SYSTEM
CDN CONTENT DISTRIBUTION NETWORK
DNS DOMAIN NAME SERVICE
POP POINT OF PRESENCE
TLD TOP LEVEL DOMAIN
FTP FILE TRANSFER PROTOCOL
HTTP HYPERTEXT TRANSFER PROTOCOL
MD5 MESSAGE-DIGEST ALGORITHM 5
URL UNIFORM RESOURCE LOCATOR
ISP INTERNET SERVICE PROVIDER
TTL TIME TO LIVE
DSLAM DIGITAL SUBSCRIBER LINE ACCESS MULTIPLEXER

REFERENCES

[1] Domain Name System definition: http://en.wikipedia.org/wiki/Domain_Name_System
[2] Akamai: http://www.akamai.com
[3] Limelight Networks: http://www.limelightnetworks.com
[4] Amazon Cloudfront: http://aws.amazon.com/cloudfront/
[5] Edgecast: http://www.edgecast.com
[6] Highwinds Network Group: http://www.highwinds.com
[7] Consistent Hashing definition: http://en.wikipedia.org/wiki/Consistent_hashing
[8] D. Karger, E. Lehman, T. Leighton, M. Levine, D. Lewin and R. Panigraphy, "Consistent Hashing and Random TreesL Distributed Caching Protocols for Retrieving Hot Spots on the World Wide Web". In ACM Symposium on Theory of Computing, 1997.
[9] C. Huang, J. Li, Angela Wang and K. W. Ross, Understanding Hybrid CDN-P2P: Why Limelight Need its Own Red Swoosh, NOSSDAV, Braunschweig, Germany, 2008.

The invention claimed is:

1. A method for DNS resolution of content requests in a CDN service, comprising identifying an end point or content server that can best serve an end user which has sent a DNS request to an ISP DNS resolver, given a geographically distributed network of end points, characterised in that said DNS resolution is carried out by performing:
I) a DNS resolution stage, comprising performing the next steps:
a) said ISP DNS resolver sending the received DNS request to an authoritative DNS server of a sub-zone, either previously known or identified by sending a request to the root DNS server of the requested domain;
b) said authoritative DNS server of said sub-zone forwarding said DNS request to the tracker operating in said sub-zone, and said tracker forwarding the received DNS request to one (End Point 2; MAD2; OB2-EP-2; R2-EP-2; R1-D3-1) of said end points participating in said DNS resolution stage; and
II) an HTTP redirection, comprising performing the next steps:
c) said end point participating in said DNS resolution stage (End Point 2; MAD2; OB2-EP-2; R2-EP-2; R1-D3-1) resolving the location of the ISP DNS resolver via a partition ID database to identify:
the datacenter (BCN) that can best serve the content; or
at least one end point (OB2-EP-1; R2-EP-1; R1-D3-2) in the same datacenter that may serve the content; and
d) said end point participating in said DNS resolution stage (End Point 2; MAD2; OB2-EP-2; R2-EP-2; R1-D3-1) performing a consistent hash on the requested URL associated with said DNS request, building a URL address using a substring of the MD5 hash of content request and the location of said datacenter (BCN) that can best serve the content or the location of said at least one end point (OB2-EP-1; R2-EP-1; R1-D3-2) in the same datacenter that may serve the content, and sending said address to the end user, directly or through intermediate entities, using a redirect message.

2. A method as per claim 1, wherein when applied to DNS resolution across only one region of an Operating business, said subzone is said region, with said DNS resolution stage of I) being a first DNS resolution stage, said redirect message being a HTTP redirect message, and the method further comprising a second DNS resolution stage comprising performing the next steps:
e) the end user making an address resolution request for said received URL address to said IDP DNS resolver;
f) the ISP DNS server forwarding said address resolution request to said sub-zone authoritative DNS server;
g) the sub-zone authoritative DNS server, forwarding the received URL to the tracker of the region to resolve the received address;
h) said tracker in the region performing a consistent hash on said substring of the URL hash to obtain the end point or end points ({End Point 3, End Point 1, End Point n}; {BCN4, BCN2}) inside said datacenter (BCN) that can best serve the content request;
i) the tracker sending a response that includes the address of at least one of said obtained end points ({End Point 3, End Point 1, End Point n}; {BCN4, BCN2}) to the sub-zone authoritative DNS server;
j) the sub-zone authoritative DNS server forwarding said tracker response to the ISP DNS resolver; and
k) the ISP DNS resolver forwarding said received response from the authoritative server of the sub-zone to the end user.

3. A method as per claim 2, wherein said step h) further comprises the tracker identifying the least-loaded end point in said datacenter (BCN) that can best serve the content by using information about the current load at said end points ({End Point 3, End Point 1, End Point n}; {BCN4, BCN2}) and including the address of only said least-loaded end point (End Point 3, BCN4) into said tracker response sent at step i).

4. A method as per claim 3, comprising, after said step j), the end user directly connecting to said least-loaded end point (End Point 3, BCN4) by sending a connect request thereto, with a URL address that is said built address that identifies the requested content file.

5. A method as per claim 1, wherein said step b) comprises said tracker using at least a round-robin scheme or a best effort geo-location scheme to match the DNS request with the end point participating in said DNS resolution stage (End Point 2; MAD2; OB2-EP-2; R2-EP-2; R1-D3-1) from said end points.

6. A method as per claim 1, wherein said authoritative DNS server of said sub-zone is previously identified via a geo-IP lookup.

7. A method as per claim 6, wherein said geo-IP lookup is carried out at an authoritative DNS server for a second-level domain.

8. A method as per claim 7, comprising:
ISP DNS resolver querying a top-level domain DNS server to resolve a second-level domain of the address of said DNS request;
the top-level domain DNS server responding to the ISP DNS resolver with the IP address of said authoritative DNS server of said second-level domain;
the ISP DNS resolver querying said authoritative DNS server of said second-level domain to resolve said second-level domain of the address of said DNS request; and
the authoritative DNS server of said second-level domain resolving said sub-zone via said geo-IP lookup, and responding to the ISP DNS resolver with the address of said sub-zone via said geo-IP lookup.

9. A method as per claim 2, wherein said tracker response contains a list of addresses of at least some of the end points in said datacenter (BCN) that can best serve the content.

10. A method as per claim 9, wherein said step h) further comprises the tracker identifying backup end points (MAD2, GLB2) outside said datacenter (BCN) that can best serve the content, where can serve the request if needed, said list of said tracker response containing addresses of said backup end points (MAD2, GLB2).

11. A method as per claim 10, wherein said datacenter (BCN) that can best serve the content is a local datacenter, and said backup endpoints (MAD2, GLB2) belong to national and/or global datacenters.

12. A method as per claim 10, comprising, after said step j), the end user directly connecting to one of the end points ({End Point 3, End Point 1, End Point n}; {BCN4, BCN2}) of said datacenter (BCN) that can best serve the content, and if unable to get the content from said end point, connecting to one of the backup end points (MAD2, GLB2) included in said list.

13. A method as per claim 1, comprising an inter-region redirection between at least two regions (Region 1, Region 2) of two Operating Businesses (OB1, OB2), said subzone DNS server
(OB2-DNS) being in one (Region 2) of said at least two regions (Region 1, Region 2), wherein:
said end user is placed in a region (Region 1), or destination region, of a first one (OB1) of said two operating businesses (OB1, OB2),
said subzone being a region (Region 2) of a second one (OB2) of said two operating businesses (OB1, OB2),
said ISP DNS resolver being placed in said second operating business (OB2),
said authoritative DNS server for said second-level domain being the authoritative DNS server for both operating businesses (OB1, OB2), and
said at least one end point that may serve the content is an end point (OB2-EP-1) placed in said second operating business (OB2).

14. A method as per claim 13, wherein said DNS resolution stage of I) is a first DNS resolution stage, said step d) further comprises said end point participating in said first DNS resolution stage (OB2-EP-2) also sending to the end user, via the tracker (OB2-Tracker) of the region (Region 2) in said second operating business (OB2), together with the built address, the IP address of at least said at least one end point (OB2-EP-1) that may serve the content.

15. A method as per claim 14, wherein said HTTP redirection of II), further comprises, after said step d):
the end user to directly connecting to said at least one end point (OB2-EP-1) that may serve the content by sending a connect request thereto, in the form of a URL that includes said built address that also identifies the requested content; and
the at least one end point (OB2-EP-1) that may serve the content receiving said connect request URL address, verifying the region information based on the IP address of the end user, modifying said URL address by including said end user region information therein, and sending said modified URL address to the end user using a HTTP redirect message;
and wherein the method further comprises a second DNS resolution stage comprising performing the next steps:
the end user sending a modified DNS request, based on said modified URL address, to the ISP DNS resolver;
the ISP DNS resolver querying the authoritative DNS server to resolve a second-level domain of said modified URL address of said modified DNS request;
the authoritative DNS server of the second level domain knows the destination region via the request URL and resolves the request from the ISP DNS resolver with the IP address of the DNS server (OB1-DNS) authoritative for the destination region (Region 1);
the ISP DNS resolver querying said DNS server (OB1-DNS) authoritative for the destination region (Region 1) to resolve said modified DNS request;
the DNS server (OB1-DNS) authoritative for the destination region (Region 1) receiving said modified DNS request and forwarding it to the tracker (OB1-Tracker) of the destination region (Region 1);
said tracker (OB1-Tracker) of the destination region (Region 1) recognizing the request to be a redirect request, identifying the end point or end points (OB1-EP-1, OB1-EP-2) that are closest to the requesting end user, and returning a list referring said end points (OB1-EP-1, OB1-EP-2) to the DNS server (OB1-DNS) authoritative for the end user region, said list being an ordered list beginning with the least loaded end point (OB1-EP1);
the DNS server (OB1-DNS) authoritative for the destination region (Region 1) returns the list of end points (OB1-EP-1, OB1-EP-2) to the ISP DNS resolver;
the ISP DNS resolver forwards the received list of end points (OB1-EP-1, OB1-EP-2) to the requesting end user;
the end user sending a content request to the closest and least loaded end point (OB1-EP-1) as indicated in said list of end points (OB1-EP-1, OB1-EP-2) together with the modified URL containing the hash of the content, the partition ID of the end user and the bucket ID of the content; and
said closest and least loaded end point (OB1-EP-1) serving the requested content to the end user.

16. A method as per claim 1, comprising an inter-region redirection between at least two regions (Region 1, Region 2) of the same Operating Business (OB1), wherein:
said end user is placed in a first region (Region 1), or destination region, of said at least two regions (Region 1, Region 2) of said operating business (OB1),
said DNS server authoritative for the subzone is in a second region (Region 2) of said at least two regions (Region 1, Region 2),
said ISP DNS resolver is placed in said second region (Region 2),
said DNS server authoritative for the second level domain is authoritative for all defined regions (Region 1, Region 2), and
said at least one end point that may serve the content is an end point (R2-EP-1) placed in said second region (Region 2).

17. A method as per claim 16, wherein said DNS resolution stage of I) is a first DNS resolution stage, said step d) further comprises said end point participating in said first DNS resolution stage (R2-EP-2) also sending to the end user, via a tracker (R2-Tracker) of said second region (Region 2), the modified URL address, and an ordered list of IP addresses of end points (R2-EP-1, R2-EP-2) with at least said at least one end point (R2-EP-1) that may serve the content.

18. A method as per claim 17, wherein said HTTP redirection of II) further comprises, after said step d):
the end user directly connecting to said at least one end point (R2-EP-1) that may serve the content by sending a connect request thereto, and the received URL address;
the at least one end point (R2-EP-1) that may serve the content receiving said URL request, verifying the partition ID of the end user, modifying said URL address by including said end user PID information therein, and returning said modified URL address to the end user using a HTTP redirect message;
and wherein the method further comprises a second DNS resolution stage comprising performing the next steps:
the end user sending a modified DNS request, based on said modified URL address to the ISP DNS resolver;
the ISP DNS resolver querying the authoritative DNS server to resolve a second-level domain of said modified URL address of said modified DNS request;
the authoritative DNS server of the second level domain resolving said end user region (Region 1) from the received URL and performing a lookup in its database and responding to the ISP DNS resolver with the IP address of the DNS server (R1-DNS) authoritative for the destination region (Region 1);

the ISP DNS resolver querying said DNS server (R1-DNS) authoritative for the destination region (Region 1) to resolve the received URL;

the DNS server (R1-DNS) authoritative for the destination region (Region 1) receiving said modified DNS request and forwarding said modified DNS request to the tracker (R1-Tracker) of the end user region (Region 1);

said tracker (R1-Tracker) of the destination region (Region 1) recognizing the request to be a redirect request, identifying an ordered list of end points (R1-EP-2, R1-EP-1) that are least loaded and closest to the requesting end user, and sending said list of end points (R1-EP-2, R1-EP-1) to the DNS server (R1-DNS) authoritative for the destination region (Region 1);

the DNS server (R1-DNS) authoritative for the end user region (Region 1) forwarding the received list of end points (R1-EP-2, R1-EP-1) to the ISP DNS resolver;

the ISP DNS resolver, returning the list of end points (R1-EP-2, R1-EP-1) to the requesting end user;

the end user sending the content request as said modified URL to the closest and least loaded end point (R1-EP-2) as indicated in said list of end points (R1-EP-2, R1-EP-1), the modified URL containing the hash of the content, the partition ID of the end user and the bucket ID of the content; and said closest and least loaded end point (R1-EP-2) serving the requested content to the end user.

19. A method as per claim 1, comprising an intra-region redirection between at least two datacenters (Datacenter 1, Datacenter 2, Datacenter 3) in the same region (Region 1) of an Operating business (OB1), wherein:

said end user is geographically close to a first datacenter (Datacenter 1) of said at least two datacenters (Datacenter 1, Datacenter 2, Datacenter 3), said subzone being said region (Region 1) in said operating business (OB1), each datacenter (Datacenter 1, Datacenter 2, Datacenter 3) comprising one or more end points (R1-D1-1, R1-D1-2; R1-D2-1, R1-D2-2; R1-D3-1, R1-D3-2);

said ISP DNS resolver is in said region (Region 1), and said at least one end point that may serve the content is an end point (R1-D3-2) placed in said region (Region 1) is in said first datacenter (Datacenter 1).

20. A method as per claim 19, wherein said DNS resolution stage of I) is a first DNS resolution stage, said step d) further comprises said end point participating in said first DNS resolution stage (R1-D3-1) also sending to the end user, together with a modified URL address, the IP addresses of at least said at least one end point (R1-D3-2) that may serve the content as ordered by the tracker (RI-Tracker).

21. A method as per claim 20, wherein said HTTP redirection of II) further comprises, after said step d):

the end user directly connecting to said end point (R1-D3-2) that may serve the content by sending a connect request thereto, with a modified URL address that also identifies the requested content;

the end point (R1-D3-2) that may serve the content receiving said connect request URL address, verifying partition ID based on the IP address of the end user, modifying said URL address by including said end user partition ID, and returning said modified URL address to the end user as a HTTP redirect message;

and wherein the method further comprises a second DNS resolution stage comprising performing the next steps:

the end user sending a modified DNS request that is the modified URL address to the ISP DNS resolver;

the ISP DNS resolver identifying said modified DNS request as destined for said region (Region 1) and querying the authoritative DNS server (R1-DNS) in said region (Region 1) to resolve the second-level domain of the received URL;

said authoritative DNS server (R1-DNS) forwarding said modified DNS request to the tracker (R1-Tracker) of said region (Region 1);

said end user region tracker (R1-Tracker) recognizing that the request is an intra-region redirect request, identifying the end point or end points (R1-D1-2, R1-D1-1) that are best positioned to serve the content to the requesting end user, and sending an ordered list referring said end points (R1-D1-2, R1-D1-1) to the end user;

the end user directly connecting to the end point (R1-D1-2) least loaded and closest to the end user as indicated in said list of end points (R1-D1-2, R1-D1-1); and said least loaded and closest end point (R1-D1-2) serving the requested content to the end user.

\* \* \* \* \*